United States Patent [19]
Archer

[11] 3,743,314
[45] July 3, 1973

[54] VEHICLE LONGITUDINAL TORSION MEMBER

[76] Inventor: James M. Archer, 2917 Grand Avenue, Billings, Mont.

[22] Filed: May 25, 1971

[21] Appl. No.: 146,772

[52] U.S. Cl. .................................. 280/124 B
[51] Int. Cl. .................................. B60g 11/18
[58] Field of Search .................... 280/124 B

[56] References Cited
UNITED STATES PATENTS

| | | | |
|---|---|---|---|
| 3,025,078 | 3/1962 | Allison | 280/124 B |
| 3,292,943 | 12/1966 | Crockett | 280/104 |
| 2,906,543 | 9/1959 | Polhemus | 280/104 |

Primary Examiner—Philip Goodman
Attorney—John J. Byrne

[57] ABSTRACT

A vehicle for traversing rough terrain having a torsion member extending between front and rear support members and means movably mounting the vehicle frame with respect to the torsion member.

5 Claims, 3 Drawing Figures

PATENTED JUL 3 1973 3,743,314

INVENTOR
JAMES M. ARCHER
BY John J. Byrne
ATTORNEY

VEHICLE LONGITUDINAL TORSION MEMBER

This invention relates to vehicles which are used in rough or off-road environments. It specifically relates to, but is not limited to, track laying over-snow vehicles of a four-track type.

It is commonly known that all vehicles are constantly subjected to twisting or torsional loads about their longitudinal axis during the course of operation over uneven surfaces. It is an objective of this invention to provide a longitudinal member in a vehicle which will accept these torsional loads while leaving the supporting chassis or body substantially free of the damaging effects of these forces. It is oftentimes possible to utilize the longitudinal member of this invention as a beam-loaded structural component in addition to its expressly stated function.

Many vehicles are essentially supported by ground-engaging means at either end thereof such as wheels, tracks, or ski type runners. It is an objective of this invention to securely connect the front support means with the rear support means through a longitudinally extending torsion member.

The connection point between the ends of the torsion member and the ground support means is of a torsionally rigid nature regardless of whatever other independent motion may be deemed necessary to a particular design. When fastened in this manner, it is apparent that upon the vehicle's encounter with a ground surface irregularity which causes the raising or lowering of one side of either front or rear ground support means, a torsional stress is introduced. This invention provides means for readily accepting and absorbing these stresses via a longitudinal torsion member.

The vehicle body, chassis, or any other delicate components which require freedom from damaging torsional loads are mounted in a freely rotatable manner about the longitudinal axis of the torsion member. The means of freely rotatable mounting permits the torsion member to twist within the bores of said mounting without imparting this twisting action to the torsionally isolated components or mass.

Stability and relationship of rotatable position of the isolated mass is provided for by a connecting link from it to a projecting arm or point of fastening on the torsion member. The point of attachment may be at any point along the torsion member's length but shall be indicated here as the approximate center or halfway on torsion member's length from either ground support means. Through use of such a link a constant relationship of position is established between the isolated mass and the torsion member only at the point of attachment of said torsion member, leaving the balance of the lengths of the torsion member on either side thereof, free to twist within the isolated mass.

A further object of this invention is to provide a change of attitude of the isolated mass as it relates to the attachment point on the torsion member or, more specifically, to induce a leveling effect of the mass should the vehicle reside on a transverse plane of angle. This change is accomplished by making the aforementioned link adjustable in length.

These and other objects of the invention will become more apparent to those skilled in the art by reference to the following detailed description when viewed in light of the accompanying drawings wherein.

Figure 1:
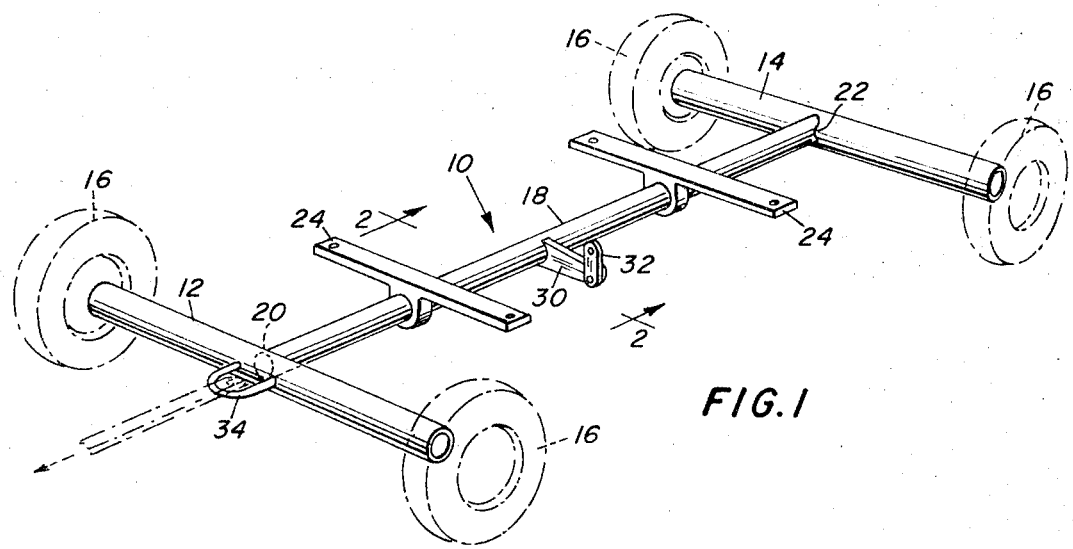
FIG. 1 is a diagrammatic-perspective of the principal elements of the invention.
Figure 2:
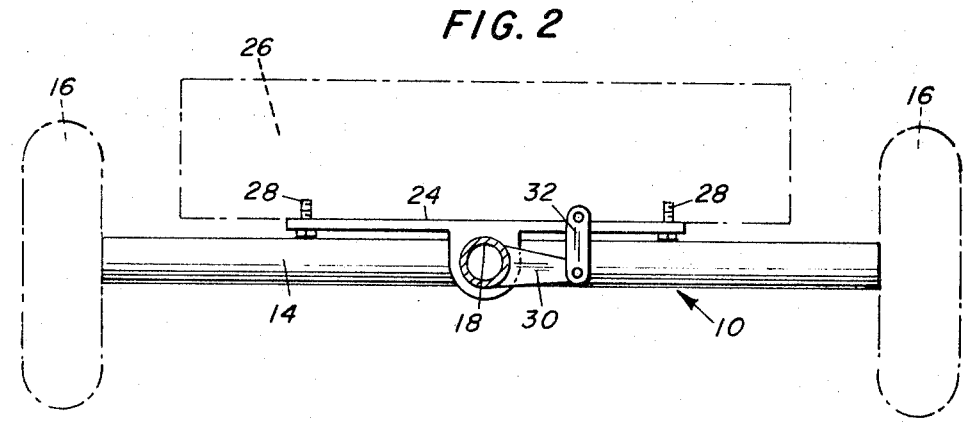
FIG. 2 is a front elevation of FIG. 1.
Figure 3:
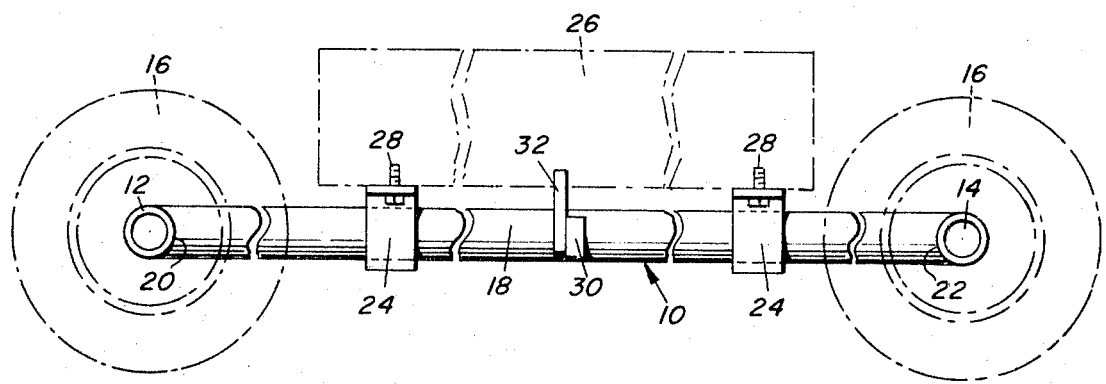
FIG. 3 is a side elevation of FIG. 1.

Referring now to the drawings wherein like numerals indicate like parts, the framework of this invention is generally indicated by the numeral 10. The framework consists of a front support member such as the axle 12 and a rear support member such as rear axle 14. As shown in the drawings, the front and rear support members are axles supporting ground-engaging members, wheels 16, at the outer ends thereof. The ground-engaging members could just as readily be skis or tracks. A torsion member 18 extends between members 12 and 14 and is rigidly and securely affixed thereto at points 20 and 22. These connections can be made by welding or the like.

Intermediate the length of torsion member 18, one or more chassis support members 24 are rotatably mounted about the torsion member 18. The vehicle chassis or body 26 is mounted to these brackets by way of bolts or the like 28. Extending outwardly from the torsion member and firmly affixed thereto is a lug member 30 which is affixed to the framework by way of an adjustable link 32.

The vehicle described can be towed, in which case a prime mover is attached to one of the support members 12 or 14 as shown diagrammatically at 34. If the vehicle is self-propelled a more sophisticated connection must be made between one of the members 12 and 14 and the torsion bar to permit steering.

In a general manner, while there has been disclosed an effective and efficient embodiment of the invention, it should be well understood that the invention is not limited to such an embodiment as there might be changes made in the arrangements, disposition, and form of the parts without departing from the principle of the present invention as comprehended within the scope of the accompanying claims.

I claim:

1. A vehicle for traversing uneven terrain comprising,
    a first member at one end of said vehicle for supporting ground-engaging means,
    a second member at the other end of said vehicle supporting second ground-engaging means,
    an elongated, one-piece torsion element extending between said first and second members and centrally of said vehicle,
    means fixedly securing the ends of said element respectively to said first and second members,
    chassis support means freely rotatably mounted about said element,
    a chasis affixed to said chassis support means, and
    adjustable linkage means connecting said torsion element to said chassis, said linkage means comprising a lug member fixedly attached to said torsion member and a link member pivotally attached at one end to the lug and pivotally attached at the other end to said chassis.

2. The invention of claim 1 wherein said ground-engaging means are wheels.

3. The invention of claim 1 wherein said chassis support means is comprised of a plurality of brackets.

4. The invention of claim 3 wherein bolt means affix said chassis to said brackets.

5. The invention of claim 3 wherein said securing means are welds.

* * * * *